(12) United States Patent
O'Neill et al.

(10) Patent No.: US 8,848,132 B2
(45) Date of Patent: Sep. 30, 2014

(54) HOLLOW BACKLIGHT WITH STRUCTURED FILMS

(75) Inventors: Mark B. O'Neill, Stillwater, MN (US);
Shandon D. Hart, Corning, NY (US);
Kenneth A. Epstein, St. Paul, MN (US);
David G. Freier, St. Paul, MN (US);
David J. Lamb, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 843 days.

(21) Appl. No.: 12/866,094

(22) PCT Filed: Feb. 6, 2009

(86) PCT No.: PCT/US2009/033356
§ 371 (c)(1),
(2), (4) Date: Nov. 4, 2010

(87) PCT Pub. No.: WO2009/100307
PCT Pub. Date: Aug. 13, 2009

(65) Prior Publication Data
US 2011/0051047 A1    Mar. 3, 2011

Related U.S. Application Data

(60) Provisional application No. 61/026,876, filed on Feb. 7, 2008.

(51) Int. Cl.
*G02F 1/1335* (2006.01)
*F21V 7/04* (2006.01)

(52) U.S. Cl.
USPC ............... 349/64; 349/67; 362/620; 362/626

(58) Field of Classification Search
USPC ............... 363/626; 362/626, 620; 349/64, 67
See application file for complete search history.

(56) References Cited

U.S. PATENT DOCUMENTS

| | | | |
|---|---|---|---|
| 3,610,729 A | 10/1971 | Rogers | |
| 3,711,176 A | 1/1973 | Alfrey, Jr. | |
| 3,773,882 A | 11/1973 | Schrenk | |
| 3,884,606 A | 5/1975 | Schrenk | |
| 4,040,727 A | 8/1977 | Ketchpel | |

(Continued)

FOREIGN PATENT DOCUMENTS

| | | |
|---|---|---|
| CN | 101042497 | 9/2007 |
| DE | 199 61 491 | 12/2000 |

(Continued)

OTHER PUBLICATIONS

3M Diffusing Film Alternative (DFA), Maximum uniformity and efficiency in flat panel displays, Brochure, 2 pages, 1996.

(Continued)

*Primary Examiner* — Dennis Y Kim
(74) *Attorney, Agent, or Firm* — Jay R. Pralle; Lisa P. Fulton

(57) ABSTRACT

A backlight (120) that includes a front reflector (130) and a back reflector (160) that form a hollow light recycling cavity (162) having an output surface (164) is disclosed. The front reflector includes at least four directional recycling films (132). The backlight also includes a semi-specular diffuser disposed between the front reflector and the back reflector, and one or more light sources (166) disposed to emit light into the light recycling cavity.

14 Claims, 3 Drawing Sheets

(56) References Cited

U.S. PATENT DOCUMENTS

| | | |
|---|---|---|
| 4,446,305 A | 5/1984 | Rogers |
| 4,456,336 A | 6/1984 | Chung |
| 4,540,623 A | 9/1985 | Im |
| 4,791,540 A | 12/1988 | Dreyer |
| 5,103,337 A | 4/1992 | Schrenk |
| 5,126,880 A | 6/1992 | Wheatley |
| 5,136,479 A | 8/1992 | Ruffner |
| 5,337,068 A | 8/1994 | Stewart |
| 5,360,659 A | 11/1994 | Arends |
| 5,381,309 A | 1/1995 | Borchardt |
| 5,440,197 A | 8/1995 | Gleckman |
| 5,448,404 A | 9/1995 | Schrenk |
| 5,453,855 A | 9/1995 | Nakamura |
| 5,568,316 A | 10/1996 | Schrenk |
| 5,594,830 A | 1/1997 | Winston |
| 5,751,388 A | 5/1998 | Larson |
| 5,771,328 A | 6/1998 | Wortman |
| 5,793,456 A | 8/1998 | Broer |
| 5,816,677 A * | 10/1998 | Kurematsu et al. ........... 362/609 |
| 5,825,543 A | 10/1998 | Ouderkirk |
| 5,828,488 A | 10/1998 | Ouderkirk |
| 5,845,038 A | 12/1998 | Lundin |
| 5,867,316 A | 2/1999 | Carlson |
| 5,882,774 A | 3/1999 | Jonza |
| 5,965,247 A | 10/1999 | Jonza |
| 5,971,551 A | 10/1999 | Winston |
| 5,976,686 A | 11/1999 | Kaytor |
| 6,019,485 A | 2/2000 | Winston |
| 6,036,328 A | 3/2000 | Ohtsuki |
| 6,080,467 A | 6/2000 | Weber |
| 6,122,103 A | 9/2000 | Perkins |
| 6,157,486 A | 12/2000 | Benson, Jr. |
| 6,157,490 A | 12/2000 | Wheatley |
| 6,210,785 B1 | 4/2001 | Weber |
| 6,262,842 B1 | 7/2001 | Ouderkirk |
| 6,267,492 B1 | 7/2001 | Reid |
| 6,276,803 B1 | 8/2001 | Aoyama |
| 6,280,063 B1 | 8/2001 | Fong |
| 6,282,821 B1 | 9/2001 | Freier |
| 6,354,709 B1 | 3/2002 | Campbell |
| 6,367,941 B2 | 4/2002 | Lea |
| 6,368,699 B1 | 4/2002 | Gilbert |
| 6,454,452 B1 | 9/2002 | Sasagawa |
| 6,531,230 B1 | 3/2003 | Weber |
| 6,566,689 B2 | 5/2003 | Hoelen |
| 6,600,175 B1 | 7/2003 | Baretz et al. |
| 6,636,283 B2 | 10/2003 | Sasagawa |
| 6,663,262 B2 | 12/2003 | Boyd |
| 6,673,425 B1 | 1/2004 | Hebrink |
| 6,738,349 B1 | 5/2004 | Cen |
| 6,762,743 B2 | 7/2004 | Yoshihara |
| 6,783,349 B2 | 8/2004 | Neavin |
| 6,788,358 B1 | 9/2004 | Kim |
| 6,809,892 B2 | 10/2004 | Toyooka |
| 6,814,456 B1 | 11/2004 | Huang |
| 6,846,089 B2 | 1/2005 | Stevenson |
| 6,893,135 B2 | 5/2005 | Wright |
| 6,895,164 B2 | 5/2005 | Saccomanno |
| 6,905,212 B2 | 6/2005 | Pate |
| 6,905,220 B2 | 6/2005 | Wortman |
| 6,917,399 B2 | 7/2005 | Pokorny |
| 6,937,303 B2 | 8/2005 | Jang |
| 6,974,229 B2 | 12/2005 | West |
| 6,975,455 B1 | 12/2005 | Kotchick |
| 7,009,343 B2 | 3/2006 | Lim |
| 7,052,168 B2 | 5/2006 | Epstein |
| 7,072,096 B2 | 7/2006 | Holman |
| 7,164,836 B2 | 1/2007 | Wright |
| 7,178,965 B2 | 2/2007 | Parker |
| 7,220,026 B2 | 5/2007 | Ko |
| 7,220,036 B2 | 5/2007 | Yi |
| 7,223,005 B2 | 5/2007 | Lamb |
| 7,229,198 B2 | 6/2007 | Sakai |
| 7,277,609 B2 | 10/2007 | Cassarly |
| 7,285,802 B2 | 10/2007 | Ouderkirk |
| 7,296,916 B2 | 11/2007 | Ouderkirk |
| 7,317,182 B2 | 1/2008 | Schultz |
| 7,320,538 B2 | 1/2008 | Ko |
| 7,329,982 B2 | 2/2008 | Conner |
| 7,364,342 B2 | 4/2008 | Parker et al. |
| 7,416,309 B2 | 8/2008 | Ko |
| 7,436,469 B2 | 10/2008 | Gehlsen |
| 7,436,996 B2 | 10/2008 | Ben-Chorin |
| 7,446,827 B2 | 11/2008 | Ko |
| 7,481,563 B2 | 1/2009 | David |
| 7,513,634 B2 | 4/2009 | Chen |
| 7,525,126 B2 | 4/2009 | Leatherdale |
| 7,604,381 B2 | 10/2009 | Hebrink et al. |
| 7,607,814 B2 | 10/2009 | Destain |
| 7,660,509 B2 | 2/2010 | Bryan |
| 7,695,180 B2 | 4/2010 | Schardt |
| 7,740,387 B2 | 6/2010 | Schultz |
| 7,773,834 B2 | 8/2010 | Ouderkirk |
| 2001/0030857 A1 | 10/2001 | Futhey et al. |
| 2002/0060907 A1 | 5/2002 | Saccomanno |
| 2002/0070914 A1 | 6/2002 | Bruning et al. |
| 2002/0141194 A1 | 10/2002 | Wortman |
| 2002/0159019 A1 | 10/2002 | Pokorny |
| 2002/0175632 A1 | 11/2002 | Takeguchi |
| 2003/0043567 A1 | 3/2003 | Hoelen |
| 2003/0086680 A1 | 5/2003 | Saccomanno |
| 2003/0202363 A1 | 10/2003 | Adachi |
| 2004/0061814 A1 | 4/2004 | Kim |
| 2004/0066651 A1 | 4/2004 | Harumoto |
| 2004/0119908 A1 | 6/2004 | Sakai |
| 2004/0179348 A1 * | 9/2004 | Pesenti ........................ 362/31 |
| 2004/0196667 A1 | 10/2004 | Lea |
| 2004/0219338 A1 | 11/2004 | Hebrink |
| 2005/0007756 A1 | 1/2005 | Yu |
| 2005/0007758 A1 | 1/2005 | Lee |
| 2005/0024554 A1 * | 2/2005 | Lee et al. ........................ 349/65 |
| 2005/0063195 A1 | 3/2005 | Kawakami |
| 2005/0073825 A1 | 4/2005 | Kuo |
| 2005/0135115 A1 | 6/2005 | Lamb |
| 2005/0135117 A1 | 6/2005 | Lamb |
| 2005/0200295 A1 | 9/2005 | Lim |
| 2005/0243576 A1 | 11/2005 | Park |
| 2005/0265029 A1 | 12/2005 | Epstein et al. |
| 2005/0265042 A1 | 12/2005 | Kim |
| 2005/0265046 A1 | 12/2005 | Liu |
| 2005/0280756 A1 | 12/2005 | Kim |
| 2005/0285133 A1 | 12/2005 | Hung |
| 2005/0286264 A1 | 12/2005 | Kim |
| 2006/0002141 A1 | 1/2006 | Ouderkirk |
| 2006/0005620 A1 | 1/2006 | Koike |
| 2006/0028817 A1 | 2/2006 | Parker |
| 2006/0082700 A1 | 4/2006 | Gehlsen |
| 2006/0103777 A1 | 5/2006 | Ko |
| 2006/0109682 A1 | 5/2006 | Ko |
| 2006/0124918 A1 | 6/2006 | Miller |
| 2006/0131601 A1 | 6/2006 | Ouderkirk |
| 2006/0146562 A1 | 7/2006 | Ko |
| 2006/0146566 A1 | 7/2006 | Ko |
| 2006/0152943 A1 | 7/2006 | Ko |
| 2006/0187650 A1 | 8/2006 | Epstein |
| 2006/0193577 A1 | 8/2006 | Ouderkirk |
| 2006/0197888 A1 * | 9/2006 | Huang et al. .................... 349/64 |
| 2006/0210726 A1 | 9/2006 | Jones |
| 2006/0220040 A1 | 10/2006 | Suzuki |
| 2006/0221610 A1 | 10/2006 | Chew |
| 2006/0250707 A1 | 11/2006 | Whitney |
| 2006/0257678 A1 | 11/2006 | Benson |
| 2006/0262564 A1 | 11/2006 | Baba |
| 2006/0268554 A1 | 11/2006 | Whitehead |
| 2006/0284569 A1 | 12/2006 | Wey |
| 2006/0290842 A1 | 12/2006 | Epstein |
| 2006/0290844 A1 | 12/2006 | Epstein |
| 2007/0008722 A1 | 1/2007 | Fujino |
| 2007/0024994 A1 | 2/2007 | Whitney |
| 2007/0030415 A1 * | 2/2007 | Epstein ........................ 349/64 |
| 2007/0047228 A1 | 3/2007 | Thompson |
| 2007/0047254 A1 | 3/2007 | Schardt |
| 2007/0047262 A1 | 3/2007 | Schardt |
| 2007/0081330 A1 | 4/2007 | Lee |

(56) References Cited

U.S. PATENT DOCUMENTS

| | | | |
|---|---|---|---|
| 2007/0091641 A1 | 4/2007 | Lin | |
| 2007/0092728 A1 | 4/2007 | Ouderkirk | |
| 2007/0097708 A1* | 5/2007 | Shim et al. | 362/620 |
| 2007/0147037 A1 | 6/2007 | Wang | |
| 2007/0153162 A1 | 7/2007 | Wright | |
| 2007/0153384 A1 | 7/2007 | Ouderkirk | |
| 2007/0153548 A1 | 7/2007 | Hamada | |
| 2007/0171676 A1 | 7/2007 | Chang | |
| 2007/0189032 A1 | 8/2007 | Chang | |
| 2007/0223245 A1 | 9/2007 | Lee | |
| 2007/0257266 A1 | 11/2007 | Leatherdale | |
| 2007/0257270 A1 | 11/2007 | Lu | |
| 2007/0258241 A1 | 11/2007 | Leatherdale | |
| 2007/0258246 A1 | 11/2007 | Leatherdale | |
| 2008/0002256 A1 | 1/2008 | Sasagawa | |
| 2008/0025045 A1 | 1/2008 | Mii | |
| 2008/0049419 A1 | 2/2008 | Ma | |
| 2008/0057277 A1 | 3/2008 | Bluem | |
| 2010/0156953 A1 | 6/2010 | Nevitt | |
| 2010/0165001 A1 | 7/2010 | Savvateev | |
| 2010/0165621 A1 | 7/2010 | Hoffend | |
| 2010/0165660 A1 | 7/2010 | Weber | |
| 2010/0238686 A1 | 9/2010 | Weber | |
| 2010/0283905 A1* | 11/2010 | Yamamoto et al. | 348/725 |
| 2010/0315832 A1 | 12/2010 | Pijlman | |
| 2011/0075398 A1 | 3/2011 | Wheatley | |
| 2011/0085110 A1* | 4/2011 | Lin et al. | 349/64 |
| 2011/0096529 A1 | 4/2011 | Wheatley | |
| 2011/0134659 A1 | 6/2011 | Aastuen | |

FOREIGN PATENT DOCUMENTS

| | | |
|---|---|---|
| EP | 0 426 397 | 5/1991 |
| EP | 0 650 010 | 4/1995 |
| EP | 1 070 913 | 1/2001 |
| EP | 1 376 708 | 1/2004 |
| EP | 1 333 705 | 8/2004 |
| EP | 1 640 756 | 3/2006 |
| EP | 1 837 701 | 9/2007 |
| EP | 1 900 996 | 3/2008 |
| EP | 1 942 302 | 9/2008 |
| JP | 09-005737 | 1/1997 |
| JP | 11-72625 | 3/1999 |
| JP | 2004-031180 | 1/2004 |
| JP | 2004-055430 | 2/2004 |
| JP | 2004-071576 | 3/2004 |
| JP | 2004-087973 | 3/2004 |
| JP | 2004-158336 | 6/2004 |
| JP | 2004-171947 | 6/2004 |
| JP | 2004-342429 | 12/2004 |
| JP | 2005-093147 | 4/2005 |
| JP | 2005-173546 | 6/2005 |
| JP | 2005-292546 | 10/2005 |
| JP | 2005-327682 | 11/2005 |
| JP | 2006-221922 | 8/2006 |
| JP | 2006-269364 | 10/2006 |
| JP | 2006-269365 | 10/2006 |
| JP | 2008-060061 | 3/2008 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01726 | 1/1997 |
| WO | WO 99/36248 | 7/1999 |
| WO | WO 99/36262 | 7/1999 |
| WO | WO 99/39224 | 8/1999 |
| WO | WO 00/43815 | 7/2000 |
| WO | WO 02/097324 | 12/2002 |
| WO | WO 03/056876 | 7/2003 |
| WO | WO 2004/031818 | 4/2004 |
| WO | WO 2006/010249 | 2/2006 |
| WO | WO 2006/043344 | 4/2006 |
| WO | WO 2006/125174 | 11/2006 |
| WO | WO 2008/144636 | 11/2008 |
| WO | WO 2008/144644 | 11/2008 |
| WO | WO 2008/144650 | 11/2008 |
| WO | WO 2008/144656 | 11/2008 |
| WO | WO 2008/146229 | 12/2008 |
| WO | WO 2008/147753 | 12/2008 |
| WO | WO 2009090811 A1 * | 7/2009 |
| WO | WO 2009/105450 | 8/2009 |

OTHER PUBLICATIONS

Denker et al., 45.1: Invited Paper: Advanced Polarizer Film for Improved Performance of Liquid Crystal Displays, 3 pages, SID 2006.

Freyssinier et al., "Evaluation of light emitting diodes for signage applications", Third International Conference of Solid State Lighting, Proceedings of SPIE, 5187, 309-317, 2004.

Kalantar and Okada, "RGB-LED Backlighting Monitor/TV for Reproduction of Images in Standard and Extended Color Spaces", FMC10-3, pp. 683-686, International Display Workshop, 2004.

Macleod, H.A., Thin-film optical filters, Second Edition, Title Page and Table of Contents, MacMillan Publishing Co., New York, 1986.

Stover, Carl PhD, Advanced Polarizer Film for Improved Performance of Liquid Crystal Displays, 10 pages, Presented at the Society for Information Displays International Conference, San Francisco, CA, Jun. 4-9, 2006.

TCO 05 (The Swedish Confederation of Professional Employees, version 2.0, Sep. 21, 2005, p. 9.

Thelan, Design of Optical Interference Coatings, McGraw Hill, Inc., Title Page, Table of Contents, and Preface, 5 pages, 1989.

Video Electronics Standards Association (VESA), Flat Panel Display Measurements Standard, v. 2.0, Jun. 1, 2001.

Weber et al., "Giant Birefringent Optics in Multilayer Polymer Mirrors", Science, vol. 287, Mar. 2000.

Vikuiti™ Display Enhancement Brochure, Vikuiti™ Brightness Enhancement Film (BEF) II, 2 pages, Copyright © 3M IPC, 2002.

Vikuiti™ Display Enhancement Brochure, Vikuiti™ Brightness Enhancement Film-Diffuse 400 (DBEF-D400), 2 pages, Copyright ©, 2004.

Vikuiti™ Display Enhancement Brochure, Vikuiti™ Dual Brightness Enhancement Film—Diffuse 550 (DBEF-D550), 2 pages, © 3M 2004.

U.S. Appl. No. 61/030,767, entitled "Backlights Having Selected Output Light Flux Distributions and Display Systems Using Same", filed Feb. 22, 2008.

U.S. Appl. No. 60/939,079, entitled "Backlight and Display System Using Same", filed May 20, 2007.

U.S. Appl. No. 60/939,085, entitled "Recycling Backlights with Semi-specular Components", filed May 20, 2007.

U.S. Appl. No. 60/939,084, entitled "Thin Hollow Backlights with Beneficial Design Characteristics", filed May 20, 2007.

U.S. Appl. No. 60/939,083, entitled "White Light Backlights and the Like with Efficient Utilization of Colored LED Sources", filed May 20, 2007.

U.S. Appl. No. 60/939,082, entitled "Collimating Light Injectors for Edge-lit Backlights", filed May 20, 2007.

U.S. Appl. No. 60/744,112, entitled "Wide Angle Mirror System", filed Mar. 31, 2006.

U.S. Appl. No. 60/978,304, entitled "Light Emitting Diode with Bonded Semiconductor Wavelength Converter", filed Oct. 8, 2007.

Search Report for International Application No. PCT/US2009/033356, 5 pgs.

Written Opinion for International Application No. PCT/US2009/033356, 6 pgs.

Cai et al., "Reflectors for Efficient and Uniform Distribution of Radiation for Lighting and Infrared Based on Non-Imaging Optics", SPIE, vol. 1528, pp. 118-128, 1991.

Collares-Pereira et al., "High Concentration Two-Stage Optics for Parabolic Trough Solar Collectors with Tubular Absorber and Large Rim Angle", Solar Energy, vol. 47, No. 6, pp. 457-466, 1991.

(56) References Cited

OTHER PUBLICATIONS

Baker et al., *Daylighting in Architecture: A European Reference Book*, pp. 4.3-4.5 1993.

Blanco et al., "Asymmetric CPC Solar Collectors with Tubular Receiver: Geometric Characteristics and Optimal Configurations", Solar Energy, vol. 37, No. 1, pp. 49-54, 1986.

Hung et al., Novel Design for LED Lens and Backlight System, pp. 476-479, IDMC 2007 Taipei, Taiwan.

Tripanagnostopoulos, Y. and Souliotis, M., "Intergrated collector storage solar systems with asymmetric CPC reflectors", Renewable Energy, vol. 29, pp. 223-248, www.sciencedirect.com, 2004.

Winston et al., *Nonimaging Optics*, Title Page & Table of Contents, Elsevier Academic Press, Amsterdam, 2005.

U.S. Appl. No. 61/058,780, entitled "Hollow Backlight with Tilted Light Source", filed Jun. 4, 2008.

U.S. Appl. No. 61/013,782, entitled "Optical Article", filed Dec. 14, 2007.

* cited by examiner

HOLLOW BACKLIGHT WITH STRUCTURED FILMS

RELATED APPLICATIONS

This application is a national stage filing under 35 U.S.C. 371 of PCT/US2009/033356, filed Feb. 6, 2009, which claims priority to U.S. Provisional Patent Application No. 61/026,876, filed on Feb. 7, 2008, the disclosure of which is incorporated by reference herein in its entirety.

The following co-owned and copending PCT patent applications are incorporated herein by reference: PCT Patent Application No. PCT/US08/064,096, entitled THIN HOLLOW BACKLIGHTS WITH BENEFICIAL DESIGN CHARACTERISTICS; PCT Patent Application No. PCT/US08/064,115, entitled RECYCLING BACKLIGHTS WITH SEMI-SPECULAR COMPONENTS; PCT Patent Application No. PCT/US08/064,129, entitled WHITE LIGHT BACKLIGHTS AND THE LIKE WITH EFFICIENT UTILIZATION OF COLORED LED SOURCES; PCT Patent Application No. PCT/US08/064,125, entitled COLLIMATING LIGHT INJECTORS FOR EDGE-LIT BACKLIGHTS; PCT Patent Application No. PCT/US08/064,133, entitled BACKLIGHT AND DISPLAY SYSTEM USING SAME.

FIELD

The present disclosure relates to extended area light sources suitable for illuminating a display or graphic from behind, commonly referred to as backlights.

BACKGROUND

Historically, simple backlight devices included only three main components: light sources or lamps, a back reflector, and a front diffuser. Such systems are still in use for general purpose advertising signs and for indoor lighting applications.

Over recent years, refinements have been made to this basic backlight design by adding other components to increase brightness or reduce power consumption, increase uniformity, and/or reduce thickness. The refinements have been fueled by demands in the high-growth consumer electronics industry for products that incorporate liquid crystal displays (LCDs), such as computer monitors, television monitors, mobile phones, digital cameras, pocket-sized MP3 music players, personal digital assistants (PDAs), and other handheld devices. Some of these refinements, such as the use of solid light guides to allow the design of very thin backlights, and the use of light management films such as linear prismatic films and reflective polarizing films to increase on-axis brightness, are mentioned herein in connection with further background information on LCD devices.

Although some of the above-listed products can use ordinary ambient light to view the display, most include a backlight to make the display visible. In the case of LCD devices, this is because an LCD panel is not self-illuminating, and thus is usually viewed using an illumination assembly or "backlight." The backlight is situated on the opposite side of the LCD panel from the viewer, such that light generated by the backlight passes through the LCD to reach the viewer. The backlight incorporates one or more light sources, such as cold cathode fluorescent lamps (CCFLs) or light emitting diodes (LEDs), and distributes light from the sources over an output area that matches the viewable area of the LCD panel. Light emitted by the backlight desirably has sufficient brightness and sufficient spatial uniformity over the output area of the backlight to provide the user with a satisfactory viewing experience of the image produced by the LCD panel.

LCD panels typically utilize only one polarization state of light, and hence for LCD applications it is important to know the backlight's brightness and uniformity for light of the correct or useable polarization state, rather than simply the brightness and uniformity of light that may be unpolarized. In that regard, with all other factors being equal, a backlight that emits light predominantly or exclusively in the useable polarization state is more efficient in an LCD application than a backlight that emits unpolarized light. Nevertheless, backlights that emit light that is not exclusively in the useable polarization state, even to the extent of emitting randomly polarized light, are still fully useable in LCD applications, since the non-useable polarization state can be eliminated by an absorbing polarizer provided between the LCD panel and the backlight.

LCD devices can generally be considered to fall within one of three categories, and backlights are used in two of these categories. In a first category, known as "transmission-type", the LCD panel can be viewed only with the aid of an illuminated backlight. That is, the LCD panel is configured to be viewed only "in transmission," with light from the backlight being transmitted through the LCD on its way to the viewer. In a second category, known as "reflective-type," the backlight is eliminated and replaced with a reflective material, and the LCD panel is configured to be viewed only with light sources situated on the viewer side of the LCD. Light from an external source (e.g., ambient room light) passes from the front to the back of the LCD panel, reflects off of the reflective material, and passes again through the LCD on its way to the viewer. In a third category, known as "transflective-type," both a backlight and a partially reflective material are placed behind the LCD panel, which is configured to be viewed either in transmission if the backlight is turned on, or in reflection if the backlight is turned off and sufficient ambient light is present.

Besides the three categories of LCD displays discussed above, backlights can also be considered to fall into one of two categories depending on where the internal light sources are positioned relative to the output area of the backlight, where the backlight "output area" corresponds to the viewable area or region of the display device. The "output area" of a backlight is sometimes referred to herein as an "output region" or "output surface" to distinguish between the region or surface itself and the area (the numerical quantity having units of square meters, square millimeters, square inches, or the like) of that region or surface.

In "edge-lit" backlights, one or more light sources are disposed—from a plan-view perspective—along an outer border or periphery of the backlight construction, generally outside the area or zone corresponding to the output area. The light source(s) typically emit light into a component referred to as a "light guide," particularly in cases where a very thin profile backlight is desired, as in laptop computer displays. The light guide is a clear, solid, and relatively thin plate whose length and width dimensions are on the order of the backlight output area. The light guide uses total internal reflection (TIR) to transport or guide light from the edge-mounted light sources across the entire length or width of the light guide to the opposite edge of the backlight, and a non-uniform pattern of localized extraction structures is provided on a surface of the light guide to redirect some of this guided light out of the light guide toward the output area of the backlight. Such backlights typically also include light management films, such as a reflective material disposed behind or below the light guide, and a reflective polarizing film and prismatic brightness enhancing film(s) disposed in front of or above the light guide to increase on-axis brightness.

In the view of Applicants, drawbacks or limitations of existing edge-lit backlights include: the relatively large mass or weight associated with the light guide, particularly for larger backlight sizes; the need to use components that are non-interchangeable from one backlight to another, since light guides must be injection molded or otherwise fabricated for a specific backlight size and for a specific source configuration; the need to use components that require substantial spatial non-uniformities from one position in the backlight to another, as with existing extraction structure patterns; and, as backlight sizes increase, increased difficulty in providing adequate illumination due to limited space or "real estate" along the edge of the display, since the ratio of the circumference to the area of a rectangle decreases linearly (1/L) with the characteristic in-plane dimension L (e.g., length, or width, or diagonal measure of the output region of the backlight, for a given aspect ratio rectangle).

In "direct-lit" backlights, one or more light sources are disposed—from a plan-view perspective—substantially within the area or zone corresponding to the output area, normally in a regular array or pattern within the zone. A strongly diffusing plate is typically mounted above the light sources to spread light over the output area. Again, light management films, such as a reflective polarizer film, and prismatic brightness enhancing film(s), can also be placed atop the diffuser plate for improved on-axis brightness and efficiency. Large area LCD applications tend to use direct-lit backlights because they are not constrained by the 1/L limitation of edge-lit backlights.

In the view of Applicants, drawbacks or limitations of existing direct-lit backlights include: inefficiencies associated with the strongly diffusing plate; in the case of LED sources, the need for large numbers of such sources for adequate uniformity and brightness, with associated high component cost and heat generation; and limitations on achievable thinness of the backlight beyond which light sources produce non-uniform and undesirable "punch-through," where a bright spot appears in the output area above each source.

In some cases, a direct-lit backlight may also include one or some light sources at the periphery of the backlight, or an edge-lit backlight may include one or some light sources directly behind the output area. In such cases, the backlight is considered "direct-lit" if most of the light originates from directly behind the output area of the backlight, and "edge-lit" if most of the light originates from the periphery of the output area of the backlight.

SUMMARY

In one aspect, the present disclosure provides a backlight that includes a front reflector and a back reflector that form a hollow light recycling cavity having an output surface. The front reflector includes a first directional recycling film having an array of prisms elongated along a first axis and a second directional recycling film disposed such that the first directional recycling film is between the second directional recycling film and the back reflector. The second directional recycling film has an array of prisms elongated along a second axis. The backlight also includes a semi-specular diffuser disposed between the front reflector and the back reflector and one or more light sources disposed to emit light into the light recycling cavity over a limited angular distribution related to an emission axis such that the first axis is substantially parallel to the emission axis.

In another aspect, the present disclosure provides a backlight that includes a front reflector and a back reflector that form a hollow light recycling cavity having an output surface, where the front reflector includes at least four directional recycling films. The backlight also includes a semi-specular diffuser disposed between the front reflector and the back reflector, and one or more light sources disposed to emit light into the light recycling cavity.

In yet another aspect, the present disclosure provides a display having a liquid crystal panel and a backlight that provides light to the liquid crystal panel. The backlight includes a front reflector and a back reflector that form a hollow light recycling cavity having an output surface. The front reflector includes a first directional recycling film having an array of prisms elongated along a first axis and a second directional recycling film disposed such that the first directional recycling film is between the second directional recycling film and the back reflector. The second directional recycling film has an array of prisms elongated along a second axis. The backlight also includes a semi-specular diffuser disposed between the front reflector and the back reflector and one or more light sources disposed to emit light into the light recycling cavity over a limited angular distribution related to an emission axis such that the first axis is substantially parallel to the emission axis.

In still yet another aspect, the present disclosure provides a display having a liquid crystal panel and a backlight that provides light to the liquid crystal panel. The backlight includes a front reflector and a back reflector that form a hollow light recycling cavity having an output surface, where the front reflector includes at least four directional recycling films. The backlight also includes a semi-specular diffuser disposed between the front reflector and the back reflector and one or more light sources disposed to emit light into the light recycling cavity.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The present disclosure is described with respect to the appended Figures, wherein.

DETAILED DESCRIPTION

Figure 1:
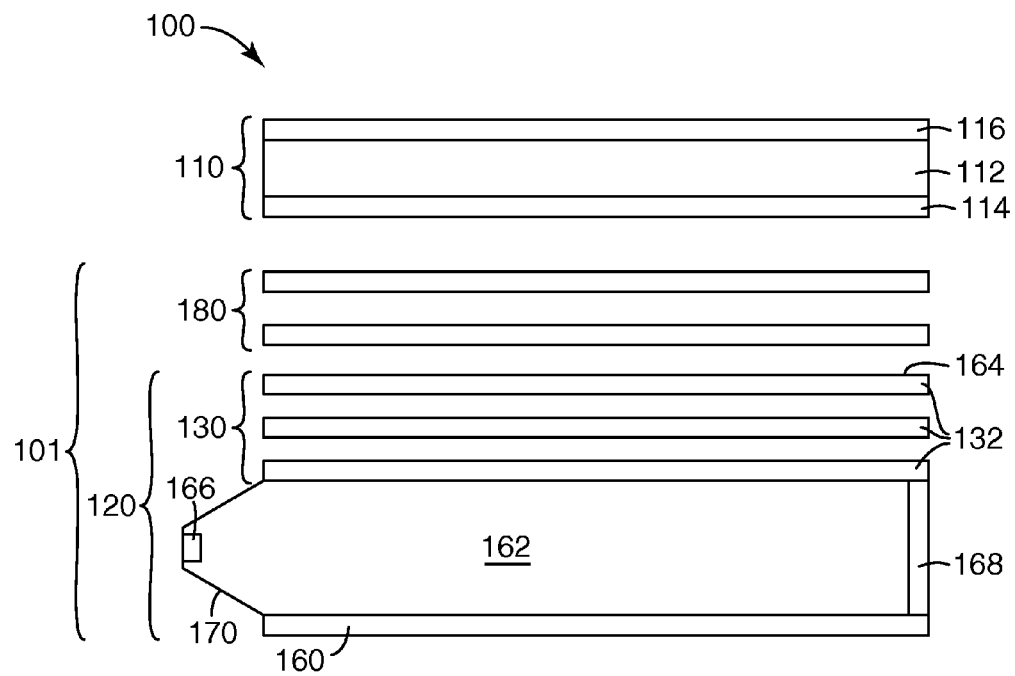
FIG. 1 is a schematic cross-sectional view of one embodiment of a display system.

In general, the present disclosure describes backlights that can provide brightness and spatial uniformity that is adequate for the intended application. Such backlights can be used for any suitable lighting application, e.g., displays, signs, general lighting, etc. In some embodiments, the described backlights include a hollow light guide formed by a front reflector and a back reflector. The front reflector can be partially transmissive, thereby allowing emission of light having a desired optical characteristic or combination of optical characteristics. In some embodiments, the desired optical characteristic can include a selected polarization state; in other embodiments, the desired optical characteristic can include emitted light having selected viewing angles.

In exemplary embodiments, the disclosed backlights balance the following characteristics: 1) the amount of recycling of light; 2) the degree of scattering of light within the cavity; and 3) the angular and spatial distribution of light directed into the cavity. This balancing/tailoring can provide substantial filling of the cavity with light (both spatially and angularly) using recycling and optionally a controlled amount of diffusion. The amount of recycling is sufficient to achieve the desired backlight uniformity, efficiency, and brightness. This balancing also provides backlights whose brightness and uniformity are compatible with high performance display applications, but where the backlights also have previously unachievable physical proportions (e.g., low profile design), optical properties (e.g., large output area for given light source emission area), or electrical efficiencies.

In conventional backlights, the bulb-to-diffuser spacing, the bulb-to-bulb spacing, and the diffuser transmission are significant factors to be considered in designing the backlight for a given value of brightness and uniformity of illumination. Generally, a strong diffuser, i.e., a diffuser that diffuses a higher fraction of the incident light, improves the uniformity but results in reduced brightness because the high diffusing level is accompanied by strong back diffusion, i.e., reflection. Such strong diffusers can also increase the overall thickness profile of the backlight.

According to some embodiments of the present disclosure, the partially transmissive front reflector may provide greater illuminance uniformity and/or color mixing without the need for a strong diffuser, thereby decreasing the thickness profile of the backlight.

In embodiments where the backlight includes light sources capable of producing light having different peak wavelengths or colors (e.g., an array of red, green, and blue LEDs), the high-recycling cavity is operable to distribute the light such that the light directed out of the device is more uniform in color and intensity. For example, when white illumination light is desired, the cavities can mix light from individually colored light sources such that the appearance at the LC panel is of a more uniform white light. Such recycling cavities can be significantly thinner than standard backlights used, e.g., for backlights in LC displays.

The backlights of the present disclosure can be utilized as backlights for display systems, e.g., LC displays. However, the backlights as described herein are not restricted to use for illuminating a liquid crystal display panel. The disclosed backlights may also be used wherever discrete light sources are utilized to generate light, and it is desirable to have uniform illumination out of a panel that includes one or more of the discrete light sources. Thus, the described backlights may be useful in solid state space lighting applications, and in signs, illuminated panels, and the like.

In general, it would be beneficial for next generation backlights to combine some or all of the following characteristics while providing a brightness and spatial uniformity that is acceptable for the intended application: thin profile; design simplicity, such as a minimal number of sources and convenient source layout; low weight; no use of or need for film components having substantial customized spatial non-uniformities from one position in the backlight to another; compatibility with LED sources; insensitivity to problems associated with color variability among LED sources that are all nominally the same color, a phenomenon known as "binning"; to the extent possible, insensitivity to the burnout or other failure of a subset of LED sources; and the elimination or reduction of at least some of the limitations and drawbacks mentioned in the Background section above.

Whether these characteristics can be successfully incorporated into a backlight depends in part on the type of light source used for illuminating the backlight. CCFLs, for example, provide white light emission over their long narrow emissive areas, and those emissive areas can also operate to scatter some light impinging on the CCFL, such as would occur in a recycling cavity. The typical emission from a CCFL, however, has an angular distribution that is substantially Lambertian, and this may be inefficient or otherwise undesirable in a given backlight design. Also, the emissive surface of a CCFL, although somewhat diffusely reflective, also typically has an absorptive loss that Applicants have found to be significant if a highly recycling cavity is desired. An LED die emits light in a near-Lambertian manner, but because of its much smaller size relative to CCFLs, the LED light distribution can be readily modified, e.g., with an integral encapsulant lens or reflector or extractor to make the resulting packaged LED a forward-emitter, a side-emitter, or other non-Lambertian profile. Such non-Lambertian profiles can provide important advantages for the disclosed backlights. However, the smaller size and higher intensity of LED sources relative to CCFLs can also make it more difficult to produce a spatially uniform backlight output area. This is particularly true in cases where individual colored LEDs, such as arrangements of red/green/blue (RGB) LEDs, are used to produce white light, since failure to provide adequate lateral transport or mixing of such light can easily result in undesirable colored bands or areas. White light emitting LEDs, in which a phosphor is excited by a blue or UV-emitting LED die to produce intense white light from a small area or volume on the order of an LED die, can be used to reduce such color non-uniformity, but white LEDs currently are unable to provide LCD color gamuts as wide as those achievable with individual colored LED arrangements, and thus may not be desirable for all end-use applications.

Applicants have discovered combinations of backlight design features that are compatible with LED source illumination, and that can produce backlight designs that outperform backlights found in state-of-the-art commercially available LCD devices in at least some respects. These backlight design features include some or all of the following:

A. a recycling optical cavity in which a large proportion of the light undergoes multiple reflections between substantially coextensive front and back reflectors before emerging from the front reflector, which is partially transmissive and partially reflective;

B. overall losses for light propagating in the recycling cavity are kept extraordinarily low, for example, both by providing a substantially enclosed cavity of low absorptive loss, including low loss front and back reflectors as well as side reflectors, and by keeping losses associated with the light sources very low, for example, by ensuring the cumulative emitting area of all the light sources is a small fraction of the backlight output area;

C. a recycling optical cavity that is hollow, i.e., the lateral transport of light within the cavity occurs predominantly in air, vacuum, or the like rather than in a dense medium such as acrylic or glass;

D. in the case of a backlight designed to emit only light in a particular (useable) polarization state, the front reflector has a high enough reflectivity for such useable light to support lateral transport or spreading, and for light ray angle randomization to achieve acceptable spatial uniformity of the backlight output, but a high enough transmission into the appropriate application-usable angles to ensure application brightness of the backlight acceptably high;

E. the recycling optical cavity contains a component or components that provide the cavity with a balance of specular and diffuse characteristics, the component having sufficient specularity to support significant lateral light transport or mixing within the cavity, but also having sufficient diffusivity to substantially homogenize the angular distribution of steady state light within the cavity, even when injecting light into the cavity only over a narrow range of propagation angles. Additionally, recycling within the cavity can result in a degree of randomization of reflected light polarization relative to the incident light polarization state. This allows for a mechanism by which unusable polarization light can be converted by recycling into usable polarization light;

F. the front reflector of the recycling cavity has a reflectivity that generally varies with angle of incidence and a transmission that generally varies with angle of incidence, where the reflectivity and transmission are for unpolarized visible light and for any plane of incidence, such that a first angular region exists in which the reflectivity is higher than external to the first angular region and a second angular region exists in which the transmissivity is higher than external to the second angular region. Additionally, the front reflector has a high value of hemispheric reflectivity, and simultaneously, a sufficiently high value of transmission of application usable light;

G. light injection optics that partially collimate or confine light initially injected into the recycling cavity to propagation directions close to a transverse plane (the transverse plane being parallel to the output area of the backlight), e.g., an injection beam having an average deviation angle from the transverse plane in a range from 0 to 45 degrees.

As mentioned herein, the backlights of the present disclosure can be used as backlights for display systems. FIG. 1 is a schematic cross-sectional view of one embodiment of an optical display 100. The display 100 includes a liquid crystal panel 110 and an illumination assembly 101 positioned to provide light to the LC panel 110. The illumination assembly 101 includes a backlight 120 and may include additional light management components 180, such as optical films.

As illustrated in FIG. 1, the LC panel 110 includes a liquid crystal layer 112, an entry plate 114, and an exit plate 116. The entry and exit plates 114 and 116, which may each include a glass substrate, may each include an electrode matrix, alignment layers, polarizers, compensation films, protective layers, and other layers. A color filter array may also be included with either or both plates 114 and 116 for imposing color on the image displayed by the LC panel 110. In the LC panel 110, portions of the liquid crystal layer 112 have their optical state altered by an electric field applied via the electrode matrix. Depending on its state, a given portion (corresponding to a pixel or subpixel of the display 100) of the liquid crystal layer 112 will rotate the polarization of light transmitted through it by a greater or lesser magnitude. Light progressing through entry polarizer of entry plate 114, liquid crystal layer 112, and exit polarizer of exit plate 116 is attenuated to varying degrees depending on the orientation of the polarizers and the optical state of the portion of the liquid crystal layer that the light encounters. The display 100 exploits this behavior to provide an electronically-controllable display having different appearances in different areas.

An arrangement of light management components 180, which may also be referred to as a light management unit, may be positioned between the backlight 120 and the LC panel 110. The light management components 180 affect the illumination light propagating from the backlight 120. For example, the arrangement of light management components 180 may include a diffuser layer, or simply, diffuser. A diffuser is used to diffuse the light received from the backlight 120.

The diffuser may be any suitable diffuser film or plate. For example, the diffuser layer can include any suitable diffusing material or materials. In some embodiments, the diffuser layer may include a polymeric matrix of polymethyl methacrylate (PMMA) with a variety of dispersed phases that include glass, polystyrene beads, and $CaCO_3$ particles. Exemplary diffusers can include 3M™ Scotchcal™ Diffuser Film, types 3635-30, 3635-70, and 3635-100, available from 3M Company, St. Paul, Minn.

The optional light management components 180 may also include a reflective polarizer. Any suitable type of reflective polarizer may be used, e.g., multilayer optical film (MOF) reflective polarizers; diffusely reflective polarizing film (DRPF), such as continuous/disperse phase polarizers; wire grid reflective polarizers; or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774 (Jonza et al.). Commercially available examples of MOF reflective polarizers include Vikuiti™ DBEF-D280 and DBEF-D400 multilayer reflective polarizers that include diffusive surfaces, available from 3M Company.

Examples of DRPF useful in connection with the present disclosure include continuous/disperse phase reflective polarizers as described, e.g., in co-owned U.S. Pat. No. 5,825,543 (Ouderkirk et al.), and diffusely reflecting multilayer polarizers as described, e.g., in co-owned U.S. Pat. No. 5,867,316 (Carlson et al.). Other suitable types of DRPF are described in U.S. Pat. No. 5,751,388 (Larson).

Some examples of wire grid polarizers useful in connection with the present disclosure include those described, e.g., in U.S. Pat. No. 6,122,103 (Perkins et al.). Wire grid polarizers are available from, inter alia, Moxtek Inc., Orem, Utah.

Some examples of cholesteric polarizers useful in connection with the present disclosure include those described, e.g., in U.S. Pat. No. 5,793,456 (Broer et al.), and U.S. patent application Ser. No. 09/791,157 (Pokorny et al.). Cholesteric polarizers are often provided along with a quarter wave retarding layer on the output side so that the light transmitted through the cholesteric polarizer is converted to linearly polarized light.

In some embodiments, a polarization control layer may be provided between the backlight 120 and a reflective polarizer. Examples of polarization control layers include a quarter wave retarding layer and a polarization rotating layer such as a liquid crystal polarization rotating layer. The polarization control layer may be used to change the polarization of light that is reflected from the reflective polarizer so that an increased fraction of the recycled light is transmitted through the reflective polarizer.

The optional arrangement of light management components 180 may also include one or more brightness enhancing layers or films, also referred to as directional recycling layers or films. A brightness enhancing layer is one that includes a surface structure that redirects off-axis light in a direction closer to the normal axis of the display. This increases the amount of light propagating on-axis through the LC panel 110, thus increasing the brightness and contrast of the image seen by the viewer. One example of a brightness enhancing layer is a prismatic brightness enhancing layer, which has a number of prismatic ridges that redirect the illumination light through refraction and reflection. Examples of prismatic brightness enhancing layers that may be used in the display system 100 include the Vikuiti™ BEF II and BEF III family of prismatic films available from 3M Company, including BEF II 90/24, BEF II 90/50, BEF IIIM 90/50, and BEF IIIT. Brightness enhancement may also be provided by some of the embodiments of front reflectors as is further described herein.

The different layers in the optional light management unit 180 may be free standing. In other embodiments, two or more of the layers in the light management unit 180 may be laminated together, for example, as discussed in co-owned U.S. patent application Ser. No. 10/966,610 (Ko et al.). Prismatic or other structured surface optical films may be attached to other films as discussed in co-owned U.S. Pat. No. 6,846,089 (Stevenson et al.). In other exemplary embodiments, the optional light management unit 180 may include two subassemblies separated by a gap, for example, as described in co-owned U.S. patent application Ser. No. 10/965,937 (Gehlsen et al.).

The display system 100 of the embodiment illustrated in FIG. 1 includes a backlight 120. Backlight 120 may be any suitable backlight as described herein. Unless otherwise indicated, references to "backlights" are also intended to apply to other extended area lighting devices that provide nominally uniform illumination in their intended application. The backlight 120 includes a front reflector 130 and a back reflector 160 that form a hollow light recycling cavity 162. The cavity 162 includes an output surface 164. The output surface 164 may be any suitable shape, e.g., rectangular, and may be of a size usable for any desired display application, ranging, for example, from a subdisplay for a mobile phone measuring approximately 30 mm diagonally to a laptop computer screen measuring approximately 30 cm diagonally to a monitor or television measuring approximately 50 cm, 80 cm, 100 cm, 150 cm, or larger diagonally. The backlight 120 also includes one or more light sources 166 disposed to emit light into the cavity 162. The backlight 120 can optionally include side reflectors or surfaces 168 surrounding the periphery of the light recycling cavity 162 on sides that do not include light sources.

As illustrated, backlight 120 includes an injector 170 that helps to direct light from the one or more light sources 166 into the light recycling cavity 162. Any suitable injector can be used with the backlight 120, e.g., those injectors described in U.S. Patent Application No. 60/939,082 (Hoffend). The injector 170 may partially collimate or confine light initially injected into the recycling cavity 162 to propagation directions close to a transverse plane (the transverse plane being parallel to the output surface of the backlight), e.g., an injection beam having an average deviation angle from the transverse plane in a range from 0 to 45 degrees, or 0 to 30 degrees, or 0 to 15 degrees. In some embodiments, light sources that themselves at least partially collimate the emitted light may be preferred. Such light sources can include lenses, extractors, shaped encapsulants, or combinations thereof of optical elements to provide a desired output.

Although depicted as having one or more light sources 166 positioned along one side of the backlight 120, in some embodiments light sources can be positioned along two, three, four, or more sides of the backlight. For example, for a rectangularly-shaped backlight, one or more light sources can be positioned along each of the four sides of the backlight. In some embodiments, geometrical relationships between light sources and front reflector components will constrain light source positioning, as disclosed herein.

The light sources 166 are shown schematically. In most cases, these sources 166 are compact light emitting diodes (LEDs). In this regard, "LED" refers to a diode that emits light, whether visible, ultraviolet, or infrared. It includes incoherent encased or encapsulated semiconductor devices marketed as "LEDs," whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light.

An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. More discussion of packaged LEDs, including forward-emitting and side-emitting LEDs, is provided herein.

Multicolored light sources, whether or not used to create white light, can take many forms in a backlight, with different effects on color and brightness uniformity of the backlight output area. In one approach, multiple LED dies (e.g., a red, a green, and a blue light emitting die) are all mounted in close proximity to each other on a lead frame or other substrate, and then encased together in a single encapsulant material to form a single package, which may also include a single lens component. Such a source can be controlled to emit any one of the individual colors, or all colors simultaneously. In another approach, individually packaged LEDs, with only one LED die and one emitted color per package, can be clustered together for a given recycling cavity, the cluster containing a combination of packaged LEDs emitting different colors such as blue/yellow or red/green/blue. In still another approach, such individually packaged multicolored LEDs can be positioned in one or more lines, arrays, or other patterns.

If desired, other visible light emitters such as linear cold cathode fluorescent lamps (CCFLs), hot cathode fluorescent lamps (HCFLs), or external electrode fluorescent lamps (EEFLs) can be used instead of or in addition to discrete LED sources as illumination sources for the disclosed backlights. In addition, hybrid systems such as, for example, (CCFL/LED), including cool white and warm white, CCFL/HCFL/EEFL, such as those that emit different spectra, may be used. The combinations of light emitters may vary widely, and include LEDs and CCFLs, and pluralities such as, for example, multiple CCFLs, multiple CCFLs of different colors, and LEDs and CCFLs.

For example, in some applications it may be desirable to replace the row of discrete light sources with a different light source such as a long cylindrical CCFL, or with a linear surface emitting light guide emitting light along its length and coupled to a remote active component (such as an LED die or halogen bulb), and to do likewise with other rows of sources. Examples of such linear surface emitting light guides are disclosed in U.S. Pat. No. 5,845,038 (Lundin et al.) and U.S. Pat. No. 6,367,941 (Lea et al.). Fiber-coupled laser diode and other semiconductor emitters are also known, and in those cases the output end of the fiber optic waveguide can be considered to be a light source with respect to its placement in the disclosed recycling cavities or otherwise behind the output area of the backlight. The same is also true of other passive optical components having small emitting areas such as lenses, deflectors, narrow light guides, and the like that give off light received from an active component such as a bulb or LED die. One example of such a passive component is a molded encapsulant or lens of a side-emitting packaged LED.

Any suitable side-emitting LED can be used for one or more light sources, e.g., Luxeon™ LEDs (available from Lumileds, San Jose, Calif.), or the LEDs described, e.g., in U.S. patent application Ser. No. 11/381,324 (Leatherdale et al.) and U.S. patent application Ser. No. 11/381,293 (Lu et al.).

In some embodiments where the backlights are used in combination with a display panel (e.g., LC panel 110 of FIG. 1), the backlight 120 continuously emits white light, and the LC panel is combined with a color filter matrix to form groups of multicolored pixels (such as yellow/blue (YB) pixels, red/green/blue (RGB) pixels, red/green/blue/white (RGBW) pixels, red/yellow/green/blue (RYGB) pixels, red/yellow/green/cyan/blue (RYGCB) pixels, or the like) so that the displayed image is polychromatic. Alternatively, polychromatic images can be displayed using color sequential techniques, where, instead of continuously back-illuminating the LC panel with white light and modulating groups of multicolored pixels in the LC panel to produce color, separate differently colored light sources within the backlight 120 (selected, for example, from red, orange, amber, yellow, green, cyan, blue (including royal blue), and white in combinations such as those mentioned above) are modulated such that the backlight flashes a spatially uniform colored light output (such as, for example, red, then green, then blue) in rapid repeating succession. This color-modulated backlight is then combined with a display module that has only one pixel array (without any color filter matrix), the pixel array being modulated synchronously with the backlight to produce the whole gamut of achievable colors (given the light sources used in the backlight) over the entire pixel array, provided the modulation is fast enough to yield temporal color-mixing in the visual system of the observer. Examples of color sequential displays, also known as field sequential displays, are described in U.S. Pat. No. 5,337,068 (Stewart et al.) and U.S. Pat. No. 6,762,743 (Yoshihara et al.). In some cases, it may be desirable to provide only a monochrome display. In those cases the backlight 120 can include filters or specific sources that emit predominantly in one visible wavelength or color.

The light sources 166 may be positioned in any suitable arrangement. Further, the light sources 166 can include light sources that emit different wavelengths or colors of light. For example, the light sources may include a first light source that emits a first wavelength of illumination light, and a second light source that emits a second wavelength of illumination light. The first wavelength may be the same as or different from the second wavelength. The light sources 166 may also include a third light source that emits a third wavelength of light. See, e.g., U.S. Patent Application No. 60/939,083 (Savvateev). In some embodiments, the various light sources 166 may produce light that, when mixed, provides white illumination light to a display panel or other device. In other embodiments, the light sources 166 may each produce white light.

The backlight 120 also includes back reflector 160 that, along with the front reflector 130 and optional side reflectors 168, form the hollow light recycling cavity 162. The back reflector 160 is preferably highly reflective. For example, the back reflector 160 can have an on-axis average reflectivity for visible light emitted by the light sources of at least 90%, 95%, 98%, 99%, or more for visible light of any polarization. Such reflectivity values also can reduce the amount of loss in a highly recycling cavity. Such reflectivity values encompass all visible light reflected into a hemisphere, i.e., such values include both specular and diffuse reflections.

The back reflector 160 can be a predominantly specular, diffuse, or combination specular/diffuse reflector, whether spatially uniform or patterned. In some embodiments, the back reflector 160 can be a semi-specular reflector as is further described herein. See also U.S. Patent Application No. 60/939,085 (Weber) and U.S. patent application Ser. No. 11/467,326 (Ma et al.). In some cases, the back reflector 160 can be made from a stiff metal substrate with a high reflectivity coating, or a high reflectivity film laminated to a supporting substrate. Suitable high reflectivity materials include Vikuiti™ Enhanced Specular Reflector (ESR) multilayer polymeric film available from 3M Company; a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum-Veredlung GmbH & Co.; MCPET high reflectivity foamed sheeting from Furukawa Electric Co., Ltd.; White Refstar™ films and MT films available from Mitsui Chemicals, Inc.; and 2xTIPS (see Examples for description).

The back reflector 160 can be substantially flat and smooth, or it may have a structured surface associated with it to enhance light scattering or mixing. Such a structured surface can be imparted (a) on the surface of the back reflector 160, or (b) on a transparent coating applied to the surface. In the former case, a highly reflecting film may be laminated to a substrate in which a structured surface was previously formed, or a highly reflecting film may be laminated to a flat substrate (such as a thin metal sheet, as with Vikuiti™ Durable Enhanced Specular Reflector-Metal (DESR-M) reflector available from 3M Company) followed by forming the structured surface, such as with a stamping operation. In the latter case, a transparent film having a structured surface can be laminated to a flat reflective surface, or a transparent film can be applied to the reflector and then afterwards a structured surface imparted to the top of the transparent film.

The backlight 120 can also include one or more side reflectors 168 located along at least a portion of the outer boundary of the backlight 120 that are preferably lined or otherwise provided with high reflectivity vertical walls to reduce light loss and improve recycling efficiency. The same reflective material used for the back reflector 160 can be used to form these walls, or a different reflective material can be used. In some embodiments, the side reflectors 168 and back reflectors 160 can be formed from a single sheet of material.

In some embodiments of the present disclosure it may be preferred that some degree of diffusion be provided within the hollow light recycling cavity. Such diffusion can provide more angular mixing of light within the cavity, thereby helping to spread the light within the cavity and provide greater uniformity in the light directed out of the cavity through the output surface. In other words, the recycling optical cavity contains a component that provides the cavity with a balance of specular and diffuse characteristics, the component having sufficient specularity to support significant lateral light transport or mixing within the cavity, but also having sufficient diffusivity to substantially homogenize the angular distribution of steady state light propagation within the cavity, even when injecting light into the cavity only over a narrow range of propagation angles. The diffusion can be provided by one or both of the front and back reflectors, the side reflectors, or by one or more layers positioned between the front and back reflectors as is further described herein.

In some embodiments, the diffusion provided within the cavity can include semi-specular diffusion. As used herein, the term "semi-specular reflector" refers to a reflector that reflects substantially more forward scattering than reverse scattering. Similarly, the term "semi-specular diffuser" refers to a diffuser that does not reverse the normal component of the incident ray for a substantial majority of the incident light, i.e., the light is substantially transmitted in the forward (z) direction and scattered to some degree in the x and y directions. In other words, semi-specular reflectors and diffusers direct the light in a substantially forward direction and thus are very different from Lambertian components which redirect light rays equally in all directions. Semi-specular reflectors and diffusers can exhibit relatively wide scattering angles; alternatively, such reflectors and diffusers can exhibit only small amounts of light deflection outside the specular direction. See, e.g., U.S. Patent Application No. 60/939,085 (Weber).

Any suitable semi-specular material or materials can be used for the front and back reflectors of the present disclosure. For example, the semi-specular back reflectors can include a partially transmitting specular reflector on a high reflectance diffuser reflector. Suitable specular reflectors include ESR (available from 3M Company) and other specular reflectors described herein. Suitable high reflectance diffuse reflectors include EDR II film (available from 3M); porous polytetrafluoroethylene (PTFE) films, such as those available from W. L. Gore & Associates, Inc.; Spectralon™ reflectance material available from Labsphere, Inc.; MCPET high reflectivity foamed sheeting from Furukawa Electric Co., Ltd.; and White Refstar™ film available from Mitsui Chemicals, Inc.

In another embodiment, a semi-specular back reflector can include a partial Lambertian diffuser on a high reflectance specular reflector. Alternatively, a forward scattering diffuser on a high reflectance specular reflector can provide a semi-specular back reflector.

The front reflector can be made semi-specular with constructions that are similar to the back reflector. For example, a partial reflecting Lambertian diffuser or a forward scattering diffuser can be combined with any of the front reflectors disclosed herein to provide a semi-specular front reflector. In another embodiment, a gain diffuser as disclosed herein is used as a semi-specular diffuser. The gain diffuser may be adjacent or connected to the back reflector or front reflector. Such a diffuser may be oriented with a surface structure facing either into or away from the recycling cavity. In one embodiment, illustrated in FIG. 7 and described herein, a gain diffuser structured layer 708 is adjacent or connected to a directional recycling film structured layer 704 adjacent the recycling cavity.

Figure 6:
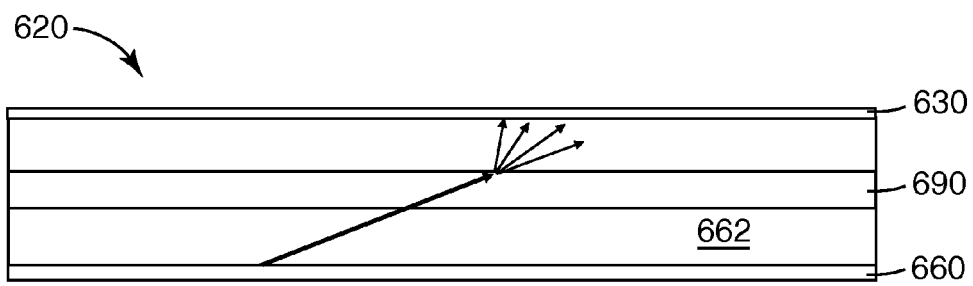
FIG. 6 is a schematic cross-sectional view of one embodiment of a backlight having a semi-specular diffuser.

As an alternative to including a semi-specular diffuser on or near a front or back reflector 630, 660, as illustrated in FIG. 6, a semi-specular diffuser 690 may be placed at any other suitable location within a recycling cavity 662 of a backlight 620. In this case a semi-specular diffuser 690 is suspended in the cavity between the front and back reflectors 630, 660, which may also include semi-specular diffusive features.

The backlight 120 of display 100 of FIG. 1 includes a front reflector 130 that includes multiple directional recycling films or layers 132. A directional recycling film is an optical film that generally includes a surface structure that redirects off-axis light in a direction closer to the axis of the display. This increases the amount of light propagating on-axis through the LC panel 110, thus increasing the brightness and contrast of the image seen by the viewer. A directional recycling film typically returns, or recycles, a significant fraction of the light incident upon it from the recycling cavity 162 back into the recycling cavity. Directional recycling films may also be referred to as brightness enhancing films or layers. Some directional recycling films may include an array of elongated prisms that redirect light. Other directional recycling films may be referred to as gain diffusers and include structures such as beads, rounded domes, pyramids or other protruding structures arranged in a regular or irregular matrix array on one or both major surfaces of a film or layer.

Figure 2:
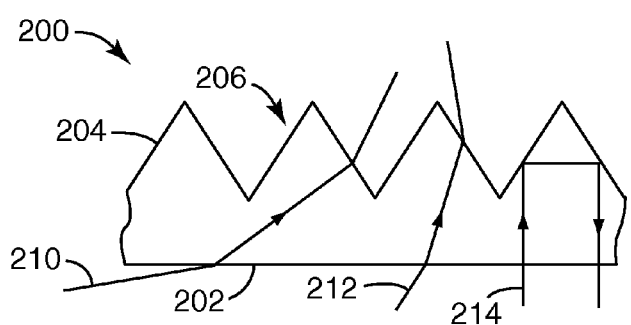
FIG. 2 is a schematic cross-sectional view of a portion of one embodiment of a prismatic optical film.

In general, prismatic directional recycling films, or brightness enhancing films, act as partial collimators of light by reflecting on-axis light and refracting off-axis light. For example, FIG. 2 is a schematic cross-section view of a portion of a prismatic brightness enhancing film 200. Film 200 has a smooth side 202 and a structured side 204. Structured side 204 includes a plurality of prisms 206. Light ray 210 is incident upon smooth surface 202 at a grazing angle, i.e., an angle to the normal approaching 90 degrees, and is refracted. Upon reaching structured surface 204, ray 210 is again refracted. Light ray 212 approaches smooth surface 202 at an angle much closer to the normal to smooth surface 202 than ray 210. It also is refracted as it passes through both the smooth surface 202 and the structured surface 204. Further, light ray 214 is incident upon smooth surface 202 at an angle even closer to the normal to smooth surface 202 than was light ray 212, and is totally internally reflected twice by structured surface 204.

As illustrated, light rays that are incident upon the brightness enhancing film 200 at relatively high angles (i.e., ray 210) tend to be refracted by the prismatic surfaces towards the normal, while light rays that are incident at relatively low angles (i.e., ray 214) tend to be reflected at the prism surfaces by total internal reflection [TIR] back towards the incident direction. By this process, light rays from an angle-mixed source, such as a recycling cavity, are concentrated through the structured surface 204 towards the normal angle. Light that is reflected back into the cavity from the TIR process at the prism faces can be reflected by a back reflector in a typical light recycling cavity. If the back reflector is diffusely reflective, or if other components in the recycling cavity are diffusive, then that reflected light is again angle mixed, and the recycling process can lead to an increase in brightness about the normal angle viewer cone, compared to the brightness into the viewer cone without the brightness enhancing film 200.

While the discussion of the prismatic directional recycling film or brightness enhancement film 200 of FIG. 2 describes specific examples of rays propagated through the particular structured side 204 shown, it will be recognized by one of skill in the art that other directional recycling films of differing structured surfaces may rely on similar or differing mechanisms to recycle light and concentrate emitted light toward the normal.

Prismatic optical films used as directional recycling films may include prisms of generally uniform shape, or they may include prisms whose shape, height, lateral position, and/or other dimensional characteristics may vary substantially from place to place on a film. Examples of prismatic optical films with varying geometry are described in U.S. Pat. No. 5,771,328 (Wortman, et al.) and U.S. Pat. No. 6,354,709 (Campbell, et al.), and U.S. patent application Ser. No. 11/467,230 (Schardt, et al.)

Figure 3:
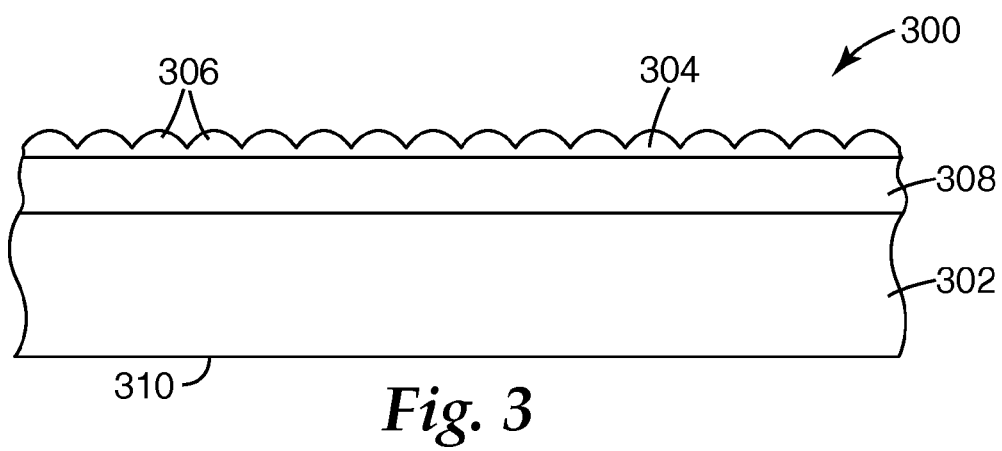
FIG. 3 is a schematic cross-sectional view of one embodiment of a gain diffuser.

In some embodiments, gain diffusers may be used as directional recycling films 132 in front reflector 130. FIG. 3 is a schematic cross-sectional view of a gain diffuser 300. Gain diffuser 300 includes a substrate 302 and a structured layer 304. The substrate 302 and structured layer 304 can be formed from any suitable optically transmissive material or materials, including polymeric materials. The structured layer 304 includes optical elements 306 disposed in a matrix array on a surface of the structured layer 304 that faces away from the substrate 302. Although the optical elements 306 are shown in cross-section, for the purposes of the present disclosure, they are disposed in a matrix array. In this matrix array, the individual optical elements 306 may be disposed in a rectangular configuration having rows and/or columns, a configuration where the individual elements are angularly and/or laterally offset with respect to each other to form a pattern that cannot be fairly characterized as having rows and/or columns, or a configuration wherein the distribution of the individual elements does not follow any discernible pattern, such as a random distribution.

In some embodiments, the gain diffuser 300 includes an additional layer 308, which may serve another optical or mechanical function, such as connecting substrate 302 with structured layer 304. In other embodiments, structured layer 304 and substrate 302 are connected without layer 308. In yet other embodiments, structured layer 304 is an integral part of substrate 302.

In addition to structured layer 304, the gain diffuser 300 may optionally include a second structured layer (not shown) disposed on opposite side 310 of substrate 302. Any suitable optical elements can be positioned on or in the structured layer 304, e.g., microspheres, beads, prisms, rounded domes, cube-corners, pyramids, lenses, or other protruding structures. The optical elements can be refractive elements, diffractive elements, diffusive elements, etc. The refractive index of structured layer 304 may be substantially uniform, or it may vary from location to location. In one embodiment, the optical elements 306 can collimate light that is transmitted by the gain diffuser 300. In other embodiments, the optical elements 306 can diffuse light either incident on, or exiting from, the gain diffuser 300, depending upon the positioning and nature of the optical elements 306.

Figure 4:
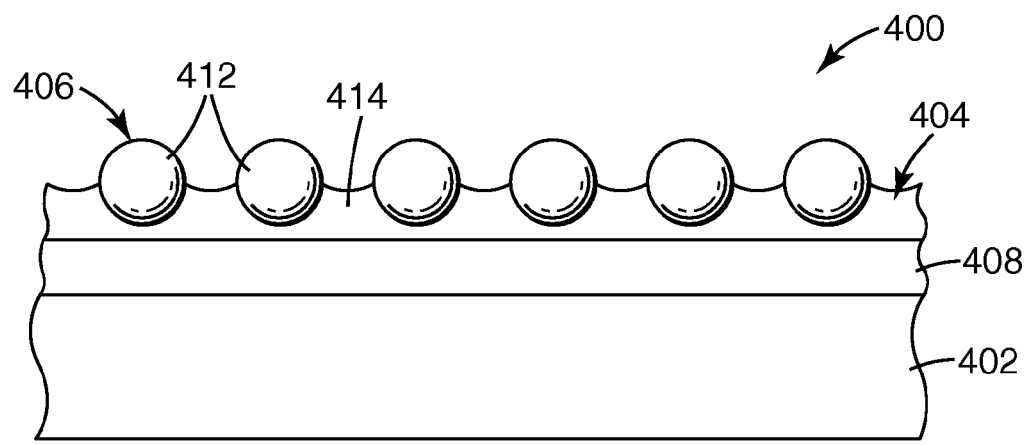
FIG. 4 is a schematic cross-sectional view of another embodiment of a gain diffuser.

The gain diffuser 300 can be manufactured using any suitable technique. In some exemplary embodiments, the transparent layer 304 can be made from a transparent curable polymeric material. In such embodiments, the optical elements 306 may be cast, embossed, or otherwise microreplicated onto the curable material, followed by curing. Another type of gain diffuser 400 is illustrated in FIG. 4, where structured layer 404 includes beads 412 dispersed in a binder 414. At least some of the beads 412 form protrusions 406. In some embodiments, the indices of refraction of the beads 412 and binder 414 may be substantially the same. In addition to the structured layer 404, the gain diffuser 400 includes a substrate 402 and, optionally, an additional layer 408. One example of a gain diffuser is Opalus BS-702, available from Keiwa Corp. Other gain diffusers are disclosed in U.S. patent application Ser. No. 10/989,161 (Ko et al.), Ser. No. 11/026,872 (Ko et al.), Ser. No. 11/026,938 (Ko et al.), Ser. No. 11/026,940 (Ko et al.) Ser. No. 11/122,864 (Whitney et al.), and Ser. No. 11/193,052 (Whitney et al.). It will be appreciated by those of skill in the art that some gain diffusers described in the aforementioned U.S. Patent Applications include optical elements that are prismatic in nature, and may be described as including an array of prisms elongated upon an axis. Such optical films may be described as prismatic directional recycling films as well as being described as gain diffuser films.

Figure 7:
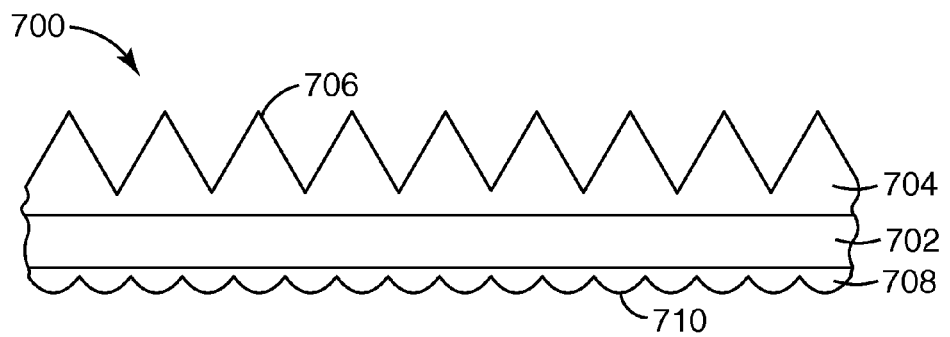
FIG. 7 is a schematic cross-section view of a portion of one embodiment of a multifunctional optical film.

As disclosed herein, a gain diffuser may act as a semi-specular diffuser when suitably placed. Such placement may include freestanding within a recycling cavity, or adjacent to or attached to a back or front reflector. FIG. 7 illustrates a multifunctional optical film 700 that may be included in a front reflector. Multifunctional film 700 includes a substrate 702, a first structured layer 704 having a plurality of prisms 706, and a second structured layer 708 having a plurality of optical elements 710. Such a film 700 may both provide semi-specular diffusion to a recycling cavity, as well as serve as one of multiple directional recycling films of a front reflector. Multifunctional film 700 may be manufactured by any suitable technique, including lamination or other attachment of a prismatic directional recycling film with a gain diffuser. In another embodiment, prisms and optical elements may be formed on a single substrate at the time of manufacture. Multifunctional film 700 may include other layers not shown in FIG. 7 that serve other functions such as optical or mechanical functions. In other embodiments, separate gain diffuser and prismatic directional recycling films may be disposed adjacent to each other and provide optical functions equivalent to multifunctional film 700 without being physically connected.

Figure 5:
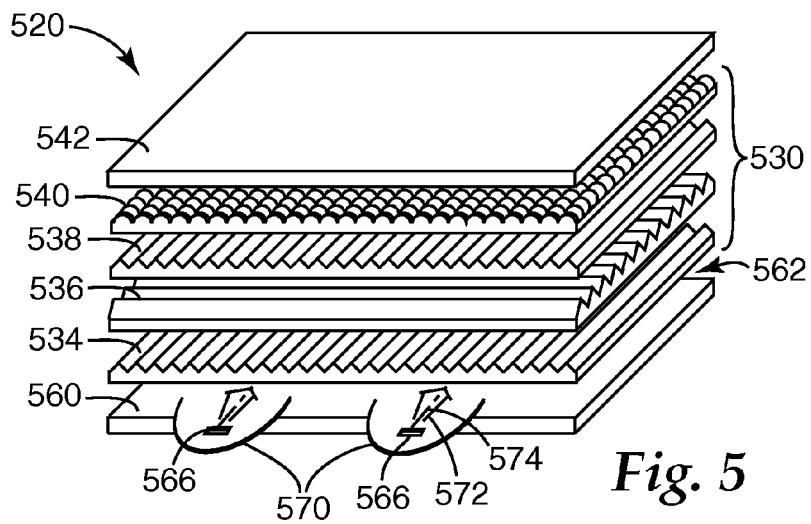
FIG. 5 is a schematic perspective view of one embodiment of a backlight.

Front reflectors used in the backlights of the present disclosure may include two, three, four, five, six, or more directional recycling films in various combinations. In embodiments with prismatic films, such as BEF films, as well as other directional recycling films, the prismatic films may be disposed closest to the recycling cavity, with the other directional recycling films disposed further from the cavity than the prismatic films. FIG. 5 is a schematic perspective view of components of an exemplary backlight 520 having a front reflector 530 and a back reflector 560 forming a recycling cavity 562. Front reflector 530 may include prismatic films 534, 536, and 538, and gain diffuser 540. Backlight 520 also includes one or more light sources 566 and injectors 570 disposed to emit light 572 into the backlight cavity. Light 572 is emitted with a limited angular distribution generally related to an emission axis 574. In some embodiments, light sources with injectors are disposed along multiple edges of backlight 520. In embodiments where alignment of other backlight components, such as prismatic directional recycling films, relative to an emission axis is specified, placement of light sources may be restricted to a subset of all possible backlight edges.

As illustrated in FIG. 5, first and third prismatic films 534 and 538 have prisms elongated along axes substantially parallel to emission axis 574, where films of the front reflector 530 are referred to in "first, second, third, etc." order starting from the interior recycling cavity 562 of the backlight 520 and progressing outward toward the LC panel (not shown). Second prismatic film 536 has prisms elongated along an axis substantially perpendicular to emission axis 574. In another embodiment, the second prismatic film has prisms elongated substantially parallel to emission axis 574, such that first, second, and third prism films 534, 536, and 538 all have prisms elongated along axes substantially parallel to emission axis 574. In yet another embodiment, first and second prism films 534 and 536 have prisms elongated along axes parallel to emission axis 574, while third prism film 538 has prisms elongated along an axis substantially perpendicular to emission axis 574. In still yet another embodiment, third prismatic film 538 may be absent from the front reflector 530, with first prismatic film 534 having prisms elongated parallel to emission axis 574, and second prismatic film 536 having prisms elongated either parallel or perpendicular to the emission axis 574. In general, front reflectors of the present disclosure may include any number of prismatic directional recycling films with individual orientations of prism elongation axes either parallel or perpendicular to a light source emission axis. Backlight configurations in which the first prismatic film 534 (i.e., the film closest to the recycling cavity 562) has prisms elongated along an axis parallel to a light source emission axis may be found to have preferred performance, in terms of luminance and uniformity across the output surface.

While the orientation of prismatic directional recycling films 534, 536, and 538 having prisms elongated along axes is described relative to emission axis 574 as being parallel or perpendicular, it will be appreciated by one of skill in the art that variations in angle from parallel and perpendicular will fall within the scope of this disclosure. Such variations may arise from manufacturing tolerances, or they may be intentionally designed into the system to ameliorate effects such as moiré, which may arise from interference between the repeating optical patterns of the prismatic films, or between the repeating optical patterns of the films and other display structures, such as the pixel array of an LC panel. Furthermore, other variations in film orientation may be specified depending on other aspects of the display design or performance goals.

Gain diffuser 540 of FIG. 5 may be a single gain diffuser, or it may represent two, three, four, five, six, or more gain diffusers. In some embodiments, front reflectors include gain diffusers without necessarily including prismatic directional recycling films. In other embodiments, one, two, three, or more gain diffusers of the same or differing construction are combined with two, three, or more prismatic films.

A front reflector 530 of a backlight 520 of the present disclosure may include optical films other than those characterized as directional recycling films. For example, front reflector 530 may include a reflective polarizer 542 such as DBEF, DRPF, or APF, as described herein. Inclusion of such a reflective polarizer may improve performance of a backlight in a variety of ways, including making the backlight more efficient, or able to produce more usable light for a given energy input to the light source or sources.

Directional recycling films and other optical films of a front reflector of a backlight may be free standing, or some or all may be physically attached to each other by any suitable technique, including such techniques as disclosed herein in conjunction with the description of other films in a light management unit of a display. Further, the description of films as included in either a "front reflector" or a "light management unit" may be considered arbitrary and non-exclusive.

Preferred front reflectors have a relatively high overall reflectivity to support relatively high recycling within the cavity. This can be characterized in terms of "hemispheric reflectivity," meaning the total reflectivity of a component (whether a surface, film, or collection of films) when light is incident on it from all possible directions. Thus, the component is illuminated with light (having a spectral distribution appropriate for an intended application) incident from all directions (and all polarization states, unless otherwise specified) within a hemisphere centered about a normal direction, and all light reflected into that same hemisphere is collected. The ratio of the total flux of the reflected light to the total flux of the incident light yields the hemispheric reflectivity, $R_{hemi}$. Characterizing a reflector in terms of its $R_{hemi}$ is especially convenient for recycling cavities because light is generally incident on the internal surfaces of the cavity—whether the front reflector, back reflector, or side reflectors—at all angles. Further, unlike the reflectivity for normal incidence, $R_{hemi}$ takes into account the variability of reflectivity with incidence angle, which may be very significant for some components (e.g., prismatic films).

Preferred back reflectors also have a high hemispherical reflectivity—typically much higher than the front reflector since the front reflector is deliberately designed to be partially transmissive in order to provide the required light output of the backlight. A recycling backlight configuration can be characterized in terms of the product of hemispheric reflectivities for both front and back reflectors, $R^f_{hemi}$ and $R^b_{hemi}$, respectively. Preferably, the product $R^f_{hemi} * R^b_{hemi}$ is at least 70% (0.70), or 75%, or 80%.

EXAMPLES

In the following examples, various front reflector film configurations were tested on 32 inch and 20 inch (measured along the diagonal) hollow backlight testbeds with a 16:9 format as listed in Tables 1 and 2, respectively. The recycling cavities of the testbeds were 17 mm and 10 mm thick, respectively. Both testbeds included back reflectors and side reflectors of Enhanced Specular Reflector (ESR) film available from 3M Company. LEDs along the top and bottom edges of the testbeds provided light to the backlights. The LEDs were arranged in an RGGB array to supply neutral colored light of sufficient luminance for an LCD backlight. An aluminum "reverse" wedge reflector was used to direct the light from each LED into the hollow recycling cavity. (See U.S. Patent Application No. 60/939,082, entitled COLLIMATING LIGHT INJECTORS FOR EDGE-LIT BACKLIGHTS for a description of this reverse wedge).

The luminance and uniformity of the examples were measured using a colorimetric camera (either model PM 1613F-1 or model PM-9913E, both from Radiant Imaging, Inc.). These two models of colorimetric camera produce data that is nearly identical when properly calibrated. The camera was fitted with a 105 mm lens and the internal ND2 neutral density filter was selected. The software supplied by Radiant Imaging was used to calibrate the camera and take the measurements. Color and luminance calibration was done with the aid of a spot radiometer (model PR650 from Photo Research, Inc.). The test bed was placed in the horizontal orientation, 1 m in front of the camera. The test bed was aligned to the camera such that the axis of the camera lens was normal to the output area and aimed approximately at the center of the test system. The camera software was set to record only the display portion of the image using the clipping feature. Exposure time was set automatically by the software to avoid overexposure of the images.

Measurements were carried out by configuring the test bed with the films to be tested and then using the colorimetric camera to take pictures of the test system. The average luminance and luminance uniformity were calculated from the measured images using custom data analysis programs.

Unless otherwise noted, the data was measured through an absorbing polarizer (HLC2-5618S from Sanritz) laminated to an acrylic plate. In examples where a reflective polarizer was included in the film stack, the pass axis of the absorbing polarizer was oriented parallel to the pass axis of the reflective polarizer.

In the following examples, the average luminance value was calculated by summing the luminance value of every pixel in an image and dividing by the total number of pixels in the recorded image. Since the image data was recorded using a colorimetric camera, this is an on-axis luminance value. Luminance uniformity was determined according to the Video Electronics Standards Association's *Flat Panel Display Measurements Standard*, v. 2.0 (published Jun. 1, 2001) standard 306-1 Sampled Uniformity and Color of White. Nine sampling points were used as defined in the standard. The luminance at each sample point was determined from the recorded image by averaging the luminance falling within an approximately circular region around the sample point location. The approximately circular region had a diameter of 3% of the diagonal of the image.

The VESA 9 pt luminance uniformity reported herein was determined from the 9 sample points as $$VESA\ 9\ \text{pt Luminance Uniformity} = \frac{L_{min}}{L_{max}}$$

where $L_{min}$ is the minimum value of the luminance of the 9 points and $L_{max}$ is the maximum value of the luminance of the 9 points. Higher values of VESA 9 pt luminance uniformity indicate systems that are more uniform.

In these examples, the following nomenclature is used to describe components of the tested front reflector film stacks.

Bottomplate polymethyl methacrylate support plate used to keep films planar.

PCGD bead coated polycarbonate gain diffuser. Where PCGD appears as the first-listed film stack component, it served as a semi-specular component, placed as the innermost film relative to the recycling cavity, with the structured surface facing the cavity.

BEF2 Brightness Enhancement Film II 90/50 with prisms perpendicular to the LED edges, i.e., prisms elongated parallel to the LED emission axis.

BEF2-rotated Brightness Enhancement Film II 90/50 with prisms parallel to the LED edges, i.e., prisms elongated perpendicular to the LED emission axis.

3T Brightness Enhancement Film III-T 90/50 with prisms perpendicular to the LED edges, i.e., prisms elongated parallel to the LED emission axis.

APF-D Advanced Polarizing Film, a multilayer reflective polarizing film available from 3M company, laminated between diffuse polycarbonate sheets.

TABLE 1

Front Reflector Film Stacks in 32 inch Backlight Testbed

| Examples (32 inch) | front reflector film stack, listed in order from inside (recycling cavity) to outside (output surface) | Average luminance cd/m² | Uniformity [VESA9] |
|---|---|---|---|
| 1 | PCGD + BEF2 + BEF2 + BEF2 + PCGD | 2657.9 | 65.9% |
| 2 | PCGD + BEF2 + BEF2 + BEF2-rotated + PCGD | 2312.4 | 70.0% |
| 3 | PCGD + BEF2 + BEF2 + BEF2 + APFD | 3984.7 | 66.9% |
| 4 | PCGD + BEF2 + BEF2 + BEF2-rotated + APFD | 3555.5 | 74.1% |

Examples 1 and 2 each included three sheets of BEF II 90/50 and a gain diffuser as a front reflector, with the difference being in the angular orientation of the third BEF film. Both examples exhibited sufficient luminance and uniformity for use in a display, with small variations in performance between the two. Examples 3 and 4 corresponded to examples 1 and 2, with the top gain diffuser sheet replaced with a reflective polarizer. As expected, the addition of a reflective polarizer enabled polarization recycling in the backlight, significantly improving the luminance values, with some improvement in uniformity for each.

TABLE 2

Front Reflector Film Stacks in 20 inch Backlight Testbed

| Examples (20 inch) | front reflector film stack, listed in order from inside (recycling cavity) to outside (output surface) | Average luminance cd/m² | Uniformity [VESA9] |
|---|---|---|---|
| 5 | bottomplate + PCGD + BEF + 3T + BEF + PCGD | 1816.4 | 80.2% |
| 6 | bottomplate + PCGD + BEF + BEF + BEFrotated + PCGD | 1675.8 | 80.6% |
| 7 | bottomplate + PCGD + BEF + 3T + BEF + BEFrotated + PCGD | 1448.7 | 81.7% |
| 8 | bottomplate + PCGD + BEF + 3T + BEF + APF-D | 2865.4 | 72.6% |
| 9 | bottomplate + PCGD + BEF + BEF + BEFrotated + APF-D | 2603.7 | 78.5% |
| 10 | bottomplate + PCGD + BEF + 3T + BEF + BEFrotated + APF-D | 2305.5 | 81.9% |

Examples 5, 6, and 7 each included three or four sheets of BEF prism films as indicated, along with a gain diffuser. Each example exhibited sufficient luminance and uniformity for use in a display. Examples 8, 9, and 10 corresponded to examples 5, 6, and 7, with the top gain diffuser sheet replaced with a reflective polarizer. As expected, the addition of a reflective polarizer enabled polarization recycling in the backlight, significantly improving the luminance values, with varied results for uniformity. In all cases, uniformity still fell within acceptable ranges for use in a display.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A backlight, comprising:
a front reflector and a back reflector that form a hollow light recycling cavity having an output surface, the front reflector comprising:
a first directional recycling film comprising a smooth surface and a structured surface opposite the smooth surface, wherein the structured surface comprises an array of prisms elongated along a first axis, and wherein the prisms face away from the back reflector; and
a second directional recycling film disposed such that the first directional recycling film is between the second directional recycling film and the back reflector, the second directional recycling film comprising an array of prisms elongated along a second axis;
a third directional recycling film disposed such that the second directional recycling film is between the third directional recycling film and the first directional recycling film;
a fourth directional recycling film disposed such that the third directional recycling film is between the fourth directional recycling film and the second directional recycling film;
a fifth directional recycling film disposed such that the fourth directional recycling film is between the fifth directional recycling film and the third directional recycling film;
a semi-specular diffuser disposed between the front reflector and the back reflector; and
one or more light sources disposed to emit light into the light recycling cavity over a limited angular distribution related to an emission axis having an average deviation angle from 0° to 45° from a transverse plane parallel to the output surface; and
wherein the first axis is substantially parallel to the emission axis.

2. The backlight of claim 1, wherein the second axis is substantially perpendicular to the first axis.

3. The backlight of claim 1, wherein the second axis is substantially parallel to the first axis.

4. The backlight of claim 1, wherein the third directional recycling film comprises an array of prisms elongated along a third axis, and wherein the prisms face away from the back reflector.

5. The backlight of claim 4, wherein the first, second and third axes are substantially parallel.

6. The backlight of claim 1, wherein the backlight exhibits a VESA 9 uniformity value of at least 50%.

7. The backlight of claim 1, wherein the output surface is generally rectangular and has a diagonal measure of at least 30 mm.

8. The backlight of claim 1, wherein the front reflector has a hemispherical reflectivity for unpolarized visible light of $R^f_{hemi}$, and the back reflector has a hemispherical reflectivity for unpolarized visible light of $R^b_{hemi}$, and $R^f_{hemi} * R^b_{hemi}$ is at least 0.70.

9. The backlight of claim 1, wherein the prisms on the second directional recycling film face away from the back reflector.

10. A backlight, comprising:
a front reflector and a back reflector that form a hollow light recycling cavity having an output surface, the front reflector comprising at least five directional recycling films, the directional recycling films comprising;
two prismatic recycling films each comprising an array of prisms elongated along an axis; and
three gain diffuser films;
wherein the axes of the two prismatic recycling films are: (1) substantially perpendicular, or (2) substantially parallel, and wherein the two prismatic recycling films are disposed such that both prismatic recycling films are between the three gain diffuser films and the back reflector;
a semi-specular diffuser disposed between the front reflector and the back reflector, wherein the semi-specular diffuser comprises a structured surface comprising an array of optical elements, and wherein the optical elements face away from the back reflector; and
one or more light sources disposed to emit light into the light recycling cavity along an emission axis having an average deviation angle from 0° to 45° from a transverse plane parallel to the output surface.

11. The backlight of claim 10, wherein the directional recycling films comprise six gain diffuser films.

12. The backlight of claim 10, wherein the front reflector further comprises a reflective polarizer.

13. A display comprising a liquid crystal panel and a backlight that provides light to the liquid crystal panel, wherein the backlight comprises:
a front reflector and a back reflector that form a hollow light recycling cavity having an output surface, the front reflector comprising:
a first directional recycling film comprising a smooth surface and a structured surface opposite the smooth surface, wherein the structured surface comprises an array of prisms elongated along a first axis, and wherein the prisms face away from the back reflector; and
a second directional recycling film comprising disposed such that the first directional recycling film is between the second directional recycling film and the back reflector, the second directional recycling film comprising an array of prisms elongated along a second axis, wherein the prisms face away from the back reflector;
a third directional recycling film disposed such that the second directional recycling film is between the third directional recycling film and the first directional recycling film;
a fourth directional recycling film disposed such that the third directional recycling film is between the fourth directional recycling film and the second directional recycling film;
a fifth directional recycling film disposed such that the fourth directional recycling film is between the fifth directional recycling film and the third directional recycling film;
a semi-specular diffuser disposed between the front reflector and the back reflector; and
one or more light sources disposed to emit light into the light recycling cavity over a limited angular distribution related to an emission axis having an average deviation angle from 0° to 45° from a transverse plane parallel to the output surface; and
wherein the first axis is substantially parallel to the emission axis.

14. A display comprising a liquid crystal panel and a backlight that provides light to the liquid crystal panel, wherein the backlight comprises:
a front reflector and a back reflector that form a hollow light recycling cavity having an output surface, the front reflector comprising at least five directional recycling films, the directional recycling films comprising;
two prismatic recycling films each comprising an array of prisms elongated along an axis; and
three gain diffuser films;
wherein the axes of the two prismatic recycling films are: (1) substantially perpendicular, or (2) substantially parallel, and wherein the two prismatic recycling films are disposed such that both prismatic recycling films are between the three gain diffuser films and the back reflector;
a semi-specular diffuser disposed between the front reflector and the back reflector, wherein the semi-specular diffuser comprises a structured surface comprising an array of optical elements, and wherein the optical elements face away from the back reflector; and
one or more light sources disposed to emit light into the light recycling cavity along an emission axis having an average deviation angle from 0° to 45° from a transverse plane parallel to the output surface.

* * * * *